United States Patent

Boatner et al.

[15] 3,651,426

[45] Mar. 21, 1972

[54] LIGHT-SENSITIVE GUNN-EFFECT DEVICE

[72] Inventors: Lynn A. Boatner, Irving, Tex.; Kenneth G. Sewell, Palo Alto, Calif.

[73] Assignee: Advanced Technology Center, Inc., Grand Prairie, Tex.

[22] Filed: June 24, 1970

[21] Appl. No.: 49,408

[52] U.S. Cl.........................331/107 G, 250/211, 317/234 V, 332/3

[51] Int. Cl...........................................................H03b 7/06

[58] Field of Search............331/107 G; 250/211; 317/234 V; 332/3

[56] References Cited

UNITED STATES PATENTS

| | | | |
|---|---|---|---|
| 3,440,425 | 4/1969 | Hutson et al. | 331/107 |
| 3,538,451 | 11/1970 | Haydl | 331/107 G |
| 3,517,336 | 6/1970 | Symanski | 317/234 |

*Primary Examiner*—John Kominski
*Attorney*—Charles W. McHugh

[57] ABSTRACT

Disclosed is a Gunn-effect device comprising, for example, a crystal of *n*-type gallium arsenide having alloyed contacts (e.g., indium and gold) which is switched from one frequency of oscillation to another by controlling the incident light while maintaining an appropriate temperature and bias voltage. It is believed that trap zones which are localized within the crystal by virtue of introducing acceptor impurities account for a frequency of oscillation different from the usual transit-time frequency. The Gunn domains and the incident light are made to dynamically perturb the trap system so as to achieve a non-equilibrium condition.

16 Claims, 14 Drawing Figures

LYNN A. BOATNER
KENNETH G. SEWELL,
INVENTORS

BY
Charles W. McHugh
ATTORNEY

LYNN A. BOATNER
KENNETH G. SEWELL,
INVENTORS

BY Charles W. McHugh
ATTORNEY

LYNN A. BOATNER
KENNETH G. SEWELL,
INVENTORS

BY Charles W. McHugh
ATTORNEY

LIGHT-SENSITIVE GUNN-EFFECT DEVICE

This invention relates generally to a light sensitive oscillator and more particularly to a light-sensitive Gunn-effect oscillator and a method of preparing the oscillator crystal.

This invention generally relates to Gunn-effect devices, so named after J. B. Gunn of International Business Machines Corporation, who, in 1963, first discovered that a tiny crystal of *n*-type gallium arsenide emits microwaves (radiation having a frequency in the region of approximately one GHz. to 100 GHz.) when biased to an appropriate voltage level. Gunn found that the inverse of the observed frequency was approximately the time required for an electron to traverse the sample at the applied voltage, and that the critical voltage necessary to induce oscillation (i.e., threshold voltage) was roughly proportional to the length of the specimen. Since the applied voltage divided by the length of the charged specimen equals the electric field existing in the specimen, these observations suggested that the appearance of the effect is solely dependent on electric field. Through a series of experiments, Gunn verified that the onset of the oscillation is determined by a critical electric field regardless of how much current was passing through the sample.

Of the several explanations first offered for the Gunn effect, the following is presently accepted as correct. In some semiconductors, current passing through them initially increases as the voltage is increased, but then begins to decrease with a further increase in voltage. Finally, a still further increase in voltage causes the current to resume rising. The region of increasing voltage where the current decreases is a region of negative differential resistance, since the slope of the current-voltage curve has changed from positive to negative. This phenomenon has significant utility because it is well known in the art that a circuit can be designed in which a negative differential resistance component will cause the system to oscillate.

The appearance of negative differential resistance in a semiconductor is based on the existence of empty electron energy levels whose energy values are higher than those occupied by conduction electrons, and on the fact that these higher energy levels have the property that electrons occupying them are less mobile under the influence of an electric field than they are in their normal state at the low energy level. As an increasing electric field is applied to a semiconductor with this property, those electrons which are excited from the initial level or band into a higher band effectively drop out of the conduction process. If the rate at which electrons are removed from the conduction process is high enough, current falls even as electric field is increased. The energy bands of certain compound semiconductors such as gallium arsenide, indium phosphide, and gallium antimonide approximate these requirements. If a voltage is applied in the negative differential resistance region, the crystal does not remain electrically homogeneous but breaks up into regions having different electric fields. More particularly, a small domain forms in the sample within which the field is very high, whereas outside this domain, in the rest of the sample, the electric field has a relatively small value. Such a high-field domain moves across the sample, usually from one electrode to the other. As each disappears at the anode, a new domain nucleates, generally near the cathode.

For a long time, it was accepted that a Gunn-effect device had a transit-time frequency which was solely determined by the length of the specimen between the electrodes, and which is substantially independent of temperature and the intensity of incident light. Yet, the Gunn effect, being a bulk effect (as contrasted to one derived from the instantaneous potential at a narrow barrier within semiconductor material) could prove to be of significant importance if somehow the bulk effect might be used to perform, within a single device, electronic functions which at present require many discrete junction devices or very complex integrated circuits.

Accordingly, it is an object of the invention to provide a new and simple way of performing certain complex electronic functions.

Another object is to provide a device wherein the electrical state of the device is a function of incident light intensity.

Yet another object is to provide a means for performing electronic functions, taking advantage of the simplicity of bulk effect devices.

Other objects and advantages of the invention will be apparent from the specification and claims and from the accompanying drawing illustrative of the invention wherein:

Figures 1, 2, 3, 4, 8:
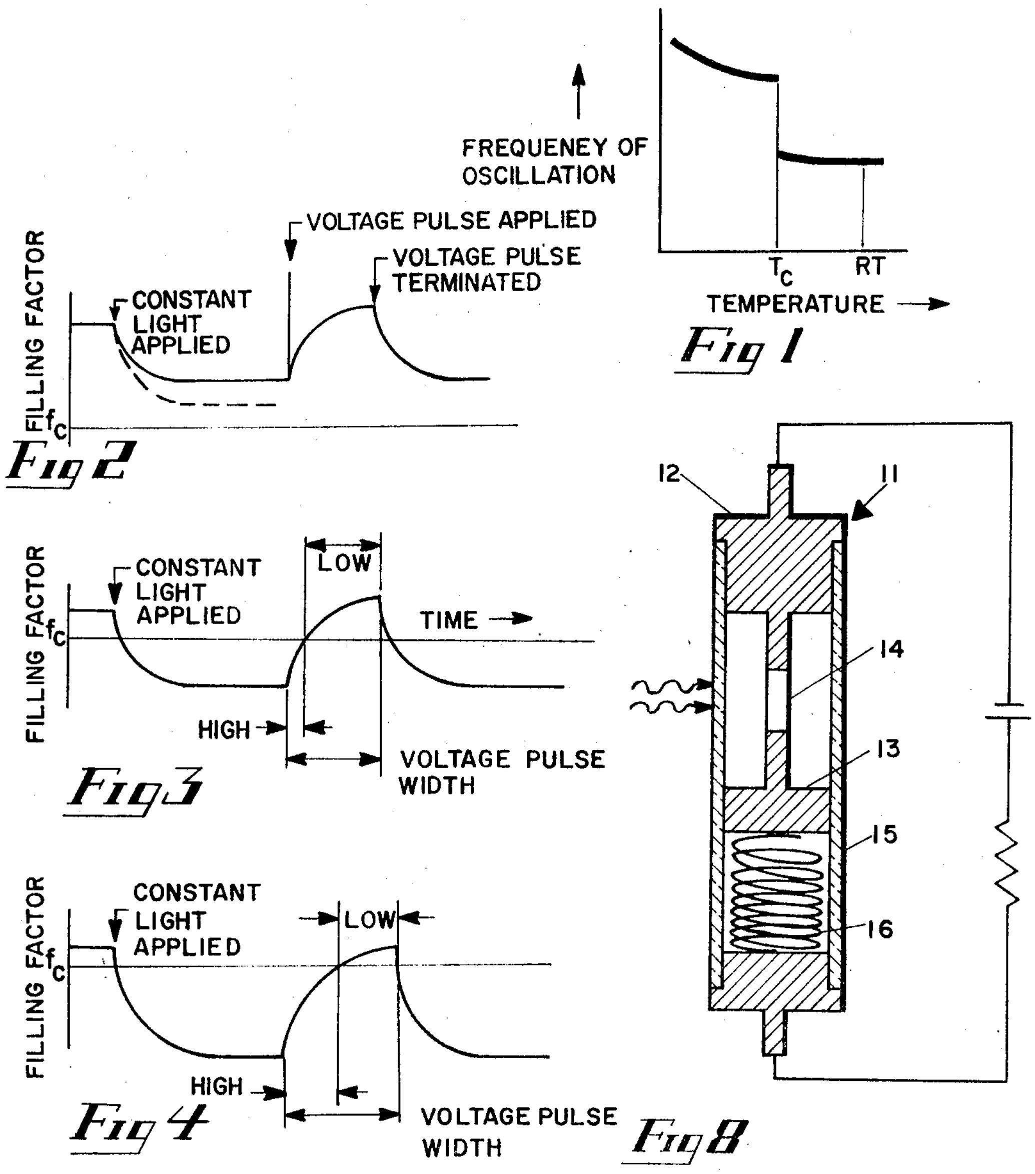
FIG. 1 is an illustrative plot of the change in frequency of oscillation of a suitably doped Gunn oscillator in response to a change in temperature.
FIG. 2 is a diagrammatic model illustrating the dynamic interaction between temperature, light and bias in an oscillator having traps.
FIG. 3 is similar to FIG. 2 but with different starting conditions, such that both high- and low-frequency oscillations are observed during a voltage pulse.
FIG. 4 is similar to FIG. 3 but having a greater portion of the voltage pulse occupied by high-frequency oscillations.
FIG. 8 is an enlarged cross-sectional view of a crystal holder which is capable of being inserted in the cryocell of FIG. 7 (in the position indicated by the broken lines)

This invention relates to a Gunn oscillator which, by virtue of its method of preparation and through control of the temperature, incident light, and bias voltage is changed from a first to a second frequency of oscillation. This device shows considerable promise for a wide range of applications including analog-to-digital converters, light sensors, and logic circuits, etc.

A device constructed in accordance with the invention includes a specially prepared Gunn-effect oscillator, a light source (preferably of an optimum wavelength), a means of applying and controlling electric fields across the oscillator, and, optionally, a means for adjusting the temperature of the oscillator, e.g., cooling or heating it. A preferred oscillator consists of a crystal of *n*-type gallium arsenide with a ohmic, alloy contact of indium and gold on each end. Any method of maintaining the oscillator at suitable temperatures while providing an optical window through which to illuminate the oscillator is satisfactory. Generally, the switching action can be routinely accomplished with a light source capable of providing several microwatts of power at the sample. For example, an ordinary two-cell flashlight has been conveniently employed in the laboratory to effect switching between the frequency states.

A characteristic of the Gunn oscillators of the invention is that, in the absence of illumination, slowly lowering the temperature of the oscillator from, say, room temperature, initially causes the frequency of the oscillations to increase by only a few percent—if at all. When the temperature is lowered still further, however, a critical temperature will eventually be reached below which the device will experience a dramatic increase in frequency of oscillation in the dark. The critical or switching temperature is usually susceptible to being fairly accurately determined, and the response of oscillation to change in temperature is rather pronounced. For example, cycling the temperature of a device within a range of 5° Celsius (i.e., critical temperature $\pm$ 2.5° C.) has always been sufficient to cause repetitive switching between the lower and the higher frequencies.

The incidence of light upon a suitably biased oscillator which was initially in the dark has also been found to cause a large frequency change, which is substantially the same as the change effected at the critical temperature. The ratio of the frequency of the device when illuminated to the frequency in the dark has been observed to easily extend from about 1.4 to 2.5. In a few instances, much larger frequency changes have been achieved. For illumination within a certain range of intensity, stable single-frequency operation is not obtained, but rather a mixed-mode type of operation is observed. For example, depending on the control of certain parameters, a high frequency state exists near the leading edge of an applied voltage pulse, while a low-frequency state follows on the trailing edge of the pulse. Once switching has occurred, the time during which this device oscillates at the higher frequency is primarily a function of the intensity of the incident light, and is not generally dependent on the length of time that the light impinges on the crystal.

By variation of certain parameters relative to the oscillator crystal, an oscillator constructed in accordance with the present invention can be made to commence operation with a period of low-frequency oscillations which will then be followed by a controllable period of high-frequency oscillations. In all embodiments, the lower (in the case of two frequencies) or lowest (when there are three or more) frequency oscillations are at the transit-time frequency of a Gunn-effect oscillator.

While no complete explanation for the frequency-switching phenomenon is known with absolute certainty, it is believed to be associated in some way with spatially-localized impurity layers or zones comprising deep acceptors existing within the oscillator crystal. The impurity is thought to be gold which is introduced into the crystal during the contact application step. The deep acceptors, when ionized by the high electric field impressed on the crystal, presumably exert a trapping action upon the domains. One can then explain the subsequent behavior associated with the application of light by assuming that some of the traps are emptied by the light, such that they are then in a condition to annihilate traveling electric field domains at a location well ahead of the anode. Since the domains travel a shorter distance when the traps are annihilating—on balance—as many domains as are being nucleated, a high-frequency mode is achieved. Whether the high-frequency mode can be achieved by the use of light primarily depends on the interrelation of three variable parameters, namely, the temperature of the crystal, the intensity of the light, and the relative sequence in which the light and the threshold bias voltage is applied.

It is worthy of note that the limited space-charge accumulation (LSA) mode of oscillation predicted and observed by J. A. Copeland of the Bell Laboratories in 1966 operates at a higher frequency than the transit-time mode (Gunn effect). In order for the LSA mode to exist, three conditions must be fulfilled: (1) the ratio of carrier density to operating frequency must lie in the range $2 \times 10^5 \geqq n/f \geqq 1.4 \times 10^3$ (second/cm$^{-3}$); (2) the device must operate into a circuit whose resonant frequency is higher than the Gunn transit-time frequency; and (3) the bias voltage must be about twice the threshold voltage for Gunn oscillations. In addition, a pronounced increase in the amplitude of the oscillations is observed when the device is switched into the LSA mode. In the case of the device of the present invention, the quantity $n/f$ has values in the range of $1.6 \times 10^6 \geqq n/f \geqq 3 \times 10^5$. Although one could probably not rule out the LSA mode on the basis of these values alone, the threshold voltage for the higher-frequency state is approximately equal to that of the usual Gunn oscillations, and the amplitude is about the same for both states. A consideration of the last two factors indicates that the LSA mode operation is not responsible for the behavior of the device of this invention.

To help explain the invention, a model will be first set forth, and experimental results that support the model will then be described. With initial reference to FIG. 1, a suitably doped semiconductor is cooled from room temperature in the dark, and a threshold bias is periodically applied to the crystal. Room temperature is designated in the figure for reference purposes, but its location in this model is strictly arbitrary. As the oscillating crystal is cooled below room temperature, it maintains a substantially constant frequency (which is a direct function of the length of the crystal) until a critical temperature, $T_c$, is reached, below which it oscillates at a much higher frequency which has no direct relationship to the transit-time frequency. Hence, the critical temperature is that temperature above which the traps are not capable of stopping travelling domains. Additionally, it is advantageous here to define a trap-filling factor, $f$, as the ratio of the number of filled traps to the number of total traps in the crystal, per cubic centimeter. Associated with the critical temperature, then, is a critical trap-filling factor, $f_c$, which is that level above which the traps are too full to stop travelling domains and the crystal will oscillate at its low, transit-time frequency. Below $f_c$, the crystal will oscillate at a higher frequency as explained hereinafter.

If the filling factor is plotted against time, and certain parameters are varied, the plot shown in FIG. 2 is obtained. The initial ordinate for the curve is solely dependent on the temperature of the oscillator in the dark, with a continual increase in temperature causing more traps to be filled and therefore increasing the value of $f$. The initial ordinate in FIG. 2 is arbitrarily selected as being above the critical level. If the crystal is subsequently illuminated, the traps will be emptied to an extent that is dependent on the intensity of the light. Thus, a whole family of curves are optionally available, with one curve being shown in FIG. 2 by a solid line and one other curve (corresponding to light of a greater intensity) being shown with a broken line.

If a single voltage pulse of at least threshold magnitude is then applied to the crystal, the curve will swing upward by an amount which is dependent on the rate at which the traps are filled by the annihilation of traveling domains. When the pulse is terminated, the filling factor will decay back to the level dictated by the previously established conditions, where it will remain until the light, temperature, or bias is again altered. In particular, it should be noted that the curve in FIG. 2 did not pass through the critical filling factor level, so the entire pulse width was occupied by low-frequency oscillations. If an additional set of conditions is now assumed, a multi-mode operation of the oscillator is obtainable, as shown in FIG. 3. First, let the temperature be initially established such that the filling factor is above but fairly close to $f_c$. Next, light of an appropriate intensity is applied so that the filling factor is reduced below $f_c$. Then, the bias pulse is applied, driving the curve upward and eventually back over $f_c$. For that portion of the pulse width during which the curve is below $f_c$, the traps are empty enough to annihilate—on balance—as many domains as are being formed, so that high frequency operation is observed. The point at which the curve moves across $f_c$ corresponds to the switching of the oscillator from its high-frequency mode to its transit-time mode of operation. A further look at FIG. 4 will reveal how the relative proportions of the high- and low-frequency portions can be adjusted by changing the light intensity. Thus, by increasing the light intensity, a greater percentage of the leading portion of the pulse width will be occupied by high-frequency oscillations, because there are more light-emptied traps to be filled. If the light is sufficiently bright, naturally it can drive the curve so far below $f_c$ that applying a bias pulse will produce only high-frequency oscillations; but it is believed that the phenomenon can more readily be utilized to advantage by adjusting parameters such that the system is perturbed in a manner that will cause the curve to cross $f_c$ at least once during the bias pulse. Naturally, the light amplitude need not remain fixed, and it can be made to vary, for example, in accordance with some analog signal.

Figure 5:
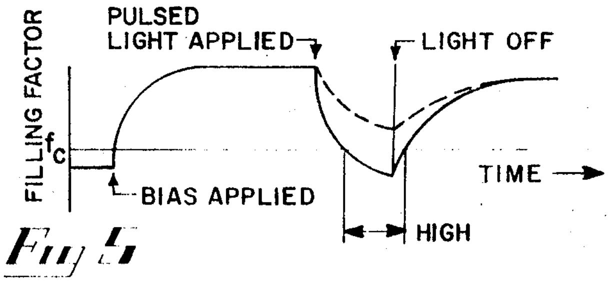
FIG. 5 is a diagrammatic model for an embodiment of the invention wherein a steady bias is applied to a Gunn oscillator and the incident light on the oscillator is pulsed.

An alternate embodiment of the invention includes the reverse of the above-described embodiment, namely, a continuous threshold bias and pulsed light. The operation of this second embodiment is represented in FIG. 5, wherein an initial filling level is again established by the selected operating temperature in the dark. A filling level associated with a certain temperature was arbitrarily selected below $f_c$ to perhaps better illustrate the interaction of temperature, light, and voltage bias. When the voltage bias is applied, the crystal will immediately begin to oscillate; and since the level of traps in the crystal is below $f_c$, the crystal will initially operate at its high frequency. As the domains that are formed during oscillation are successively annihilated by the traps, the plot of the filling level will rapidly move above $f_c$ and the crystal will switch to a low-frequency, transit-time mode. As before, the height of the increase resulting from the voltage bias is proportional to the rate of trap filling due to the annihilation of Gunn-domains. If light is subsequently introduced into the system, the crystal will continue to oscillate (because the bias is on), but it is subject to switching from its low- to its high-frequency mode in accordance with pulse light. The solid line on FIG. 5 represents light of a given intensity, and the broken line represents light of a lower intensity. A variety of effects could be measured to derive meaningful information from the plot shown in FIG. 5. For example, measurement could be made of the number of cycles or the length of time at which the crystal oscillates in its high-frequency mode, or the length of time from the light-on signal until the crystal actually switched from the low- to the high-frequency state, etc., all of which are functions of light intensity.

In both the steady-light/pulsed-voltage embodiment and the steady-voltage/pulsed-light embodiment, the duration of the pulsed parameter should be about the same order of magnitude as the relaxation time associated with changing the trap-filling factor. By so limiting the pulse width, assurance is achieved that the trap system will be in a non-equilibrium condition during operation of the device. It will be understood, then, that the emphasis herein is on the advantages to be gained from attention to the dynamic interaction of the various parameters, with less concern for the equilibrium state that would eventually be achieved with longer pulse widths or with continuous operation.

EXAMPLE

Figure 6:
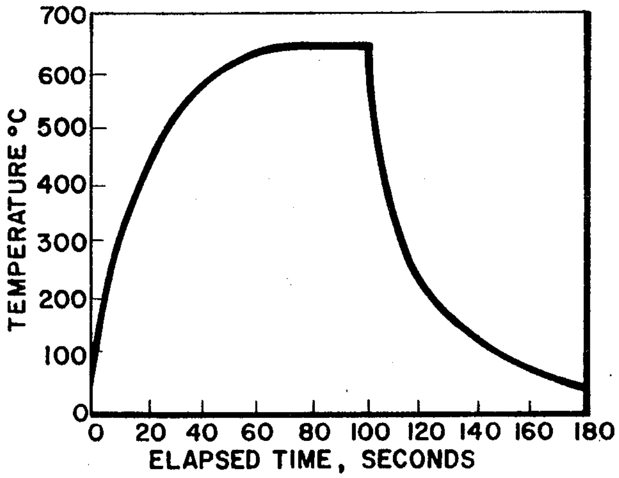
FIG. 6 is a time/temperature history of an alloying process which produces traps within *n*-type gallium arsenide.

To help explain the invention, the construction of actual oscillators and the results of certain experiments will now be described. Further, *n*-type gallium arsenide suitable for fabricating Gunn oscillators was obtained from the Monsanto Chemical Company. The material was boat-grown, oxygen-doped, and had a resistivity of 2.1 ohm-cm. and a mobility of 6,000 $cm.^2$/volt-sec. Each oscillating crystal consisted of a rectangular parallelepiped chip which was 1.0 millimeter in length and 250 microns by 250 microns in cross-section. The chips were formed by taking a 1.0 mm. slice from a wafer of the gallium arsenide which had a thickness of 0.25 mm. The slices of material were boiled in acetone to remove any wax, etc. and then boiled in ethanol to remove any oxides. The slices were next etched for about one minute per side in a bath of 3 $H_2SO_4$ : 1 $H_2O_2$ : 1 $H_2O$. They were rinsed in water and dried in a vacuum dessicator. Ohmic contacts were applied to the two sides of the slice which were separated by the 1.0 mm. dimension. The contacts were applied by suitable masking and vacuum deposition of a 0.5 micron layer of indium (In) on the two opposite sides of the slice and a 0.1 micron layer of gold (Au) on the same surfaces, and subsequently alloying-in the deposits of indium and gold in a hydrogen-atmosphere furnace at a maximum temperature of about 650° C. The slice was gradually heated and cooled, and was at a temperature above 200° C. for about 2 minutes. FIG. 6 shows the time/temperature history of the crystal during the alloying operation. Gradual heating of the crystal is important because, for one reason, the coefficient of thermal expansion of gold is about three times that of gallium arsenide. Thereafter, the slice was scribed and divided into samples 250 microns by 250 microns in cross-section; the length of each crystal between the contacts was 1.0 mm. The quality of the In-Au contacts was checked by plotting current/voltage characteristics at temperature ranging from 17° C. to −38° C., both with and without sample illumination, at low voltages. In all cases, the tested contacts were ohmic, independent of voltage polarity, and unaffected by illumination of sufficient intensity to produce the multimode effect.

Figures 7, 10:
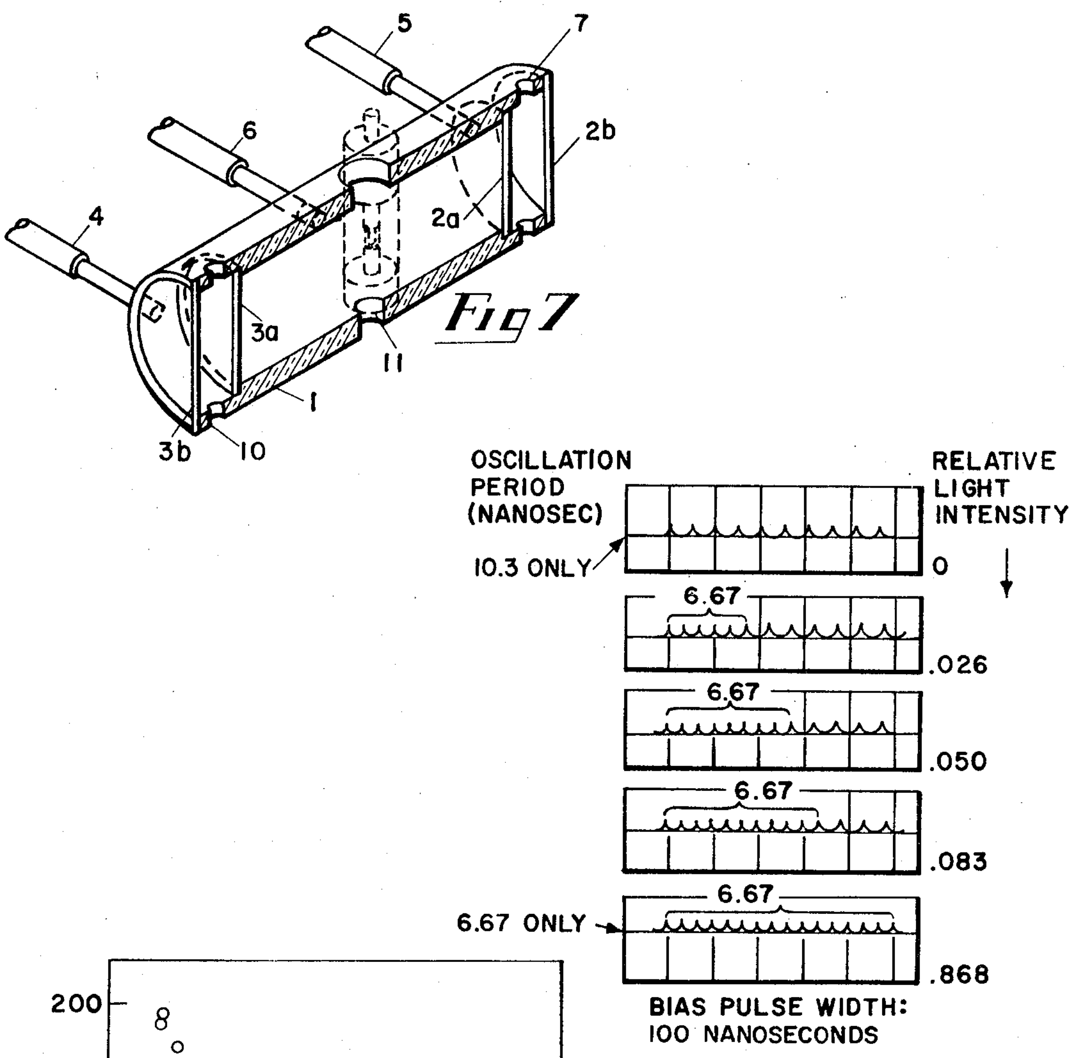
FIG. 7 illustrates an optical transmission cryocell suitable for controlling the temperature concurrently with illuminating a device of the invention.
FIG. 10 shows in a series of oscilloscope trace representations the effect of illumination of various intensities on the frequency of oscillation of a device of the invention.

The oscillators were mounted in a simple, optical-transmission cryocell such as that described by the present inventors in The Review of Scientific Instruments, Vol. 38, No. 8, 116, Aug. 1967, and, as there described, having provisions for cooling with dry nitrogen. The cryocell obviates the need for a vacuum jacket or Dewar-type construction and, as shown in FIG. 7, consists of a single, thickwalled tube 1 with double-walled windows 2*a* and 2*b* and 3*a* and 3*b* on each end. In order to eliminate moisture condensation and frost formation on these optical windows, inlets 4 and 5 through the wall of the tube 1 are provided for circulating dry, room-temperature nitrogen through the window cavities defined between the window wall-pairs 2*a*, 2*b* and 3*a* and 3*b*. The inner cavity between window walls 2*a* and 3*a* is cooled by a continuous flow of cold nitrogen gas through inlet 6.

In one embodiment wherein cooling is employed, the cryocell comprises a Plexiglas tube 1 having an outside diameter of 1.2 cm. and an inside diameter of 0.75 cm. Seats for the inner windows 2*a* and 3*a* and outer windows 2*b* and 3*b* are machined into the tube. Ordinary rubber cement serves well as a bonding agent for the windows and also permits their easy replacement. Each window cavity is provided with two outlets 7 and 8 and 9 and 10 in order to obtain circulation of relatively warm nitrogen gas over the entire window area. The oscillator is positioned so that the entering gas from inlet 6 impinges directly upon it. The temperature of the device is then controlled by varying the temperature of the cold nitrogen gas admitted through inlet 6. An entrance perpendicular to the cold-gas inlet 6 is provided for insertion of a holder 11 for the oscillator. The tubular crystal-holder 11 (See FIG. 8) is preferably fitted with spring-loaded metal contacts 12, 13 (e.g., brass) for mounting the crystal 14 there between and within the central cavity of the tube; the spring-loaded contacts compensate for any change in size of the apparatus due to temperature change. Openings in the transparent wall of the tube 15 permit the cold gas to circulate freely within the before it is vented from the cryocell through an outlet (not shown). A nonresonant resistive circuit and a voltage pulsing means capable of repetition rates of 120 pulses/second and of providing electric fields across the oscillator in the range of 3,000 to 6,000 volts/cm. were employed for effecting operation of the device to be observed. At room temperature (25° C.), the gallium arsenide crystals exhibited a frequency of oscillation of about 85 MHz.

Figure 9:
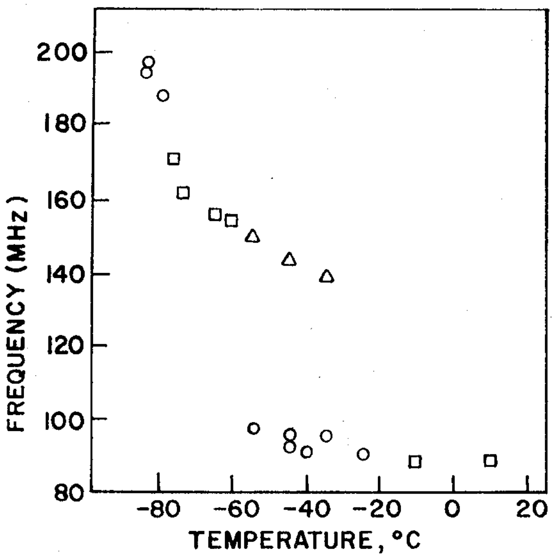
FIG. 9 depicts the variation in frequency of oscillation of a device of the invention with temperature.

FIG. 9 represents the frequency variation in accordance with temperature of a Gunn oscillator according to one embodiment of the invention. Those temperatures at which the device was relatively insensitive to light are indicated by squares. The frequencies which were obtained only when the device was not illuminated are indicated by circles. Those frequencies which were achieved through a combination of cooling and illumination are designed by triangles. It will be seen from examining FIG. 9 that lowering the temperature of the operating device produced no change in frequency until a temperature of about -20° C. was reached. In the temperature region of from −20° to −60° C., the device was capable of oscillating in either of two frequency states, depending upon the presence or absence of illumination. In the range from −45° to 55° C. the oscillator was found to be particularly sensitive to illumination; illumination of the crystal in this temperature range caused this particular device to switch from oscillation at about 85 MHz. to oscillation at about 150 MHz. The magnitude of frequency jump which was obtained upon illumination was selectively variable in accordance with the operating temperature.

In some applications of the present invention, such as an analog-to-digital converter, extreme sensitivity to light is usually not desired. Hence, operation of the above-described device (with its unique doping) as a practical A to D converter would naturally be confined to temperatures above −55° C. In fact, lowering the temperature of this particular device to near −60° C. caused it exhibit what may appropriately be described as extreme sensitivity to light, and it switched back and forth from the lower to the higher-frequency state of oscillation with minute and chance variations in illumination. Thus, the device was so sensitive that seemingly inordinate precautions had to be taken to shield remote instrument dials in the laboratory so that stable operation could be obtained. Such sensitivity can be beneficial, however, when the device is to be operated as a light detector. For use as a light detector this particular device would naturally be operated as near as practical to its critical temperature (i.e., slightly above −60° C.) at which switching would always occur in the absence of illumination. When operated very near its critical temperature in the dark, the addition of a relatively small amount of light will cause the device to switch. Additional treatment of the light detector application will be made in later paragraphs.

FIG. 10 represents a series of five successive traces of frequency of oscillation at a temperature of −55° C. and at a relative intensity of illumination, from top to bottom of 0 (no light), 0.026, 0.050, 0.083, and 0.868, respectively. The approximate period of the oscillation, in nanoseconds, is indicated by the scale on the left. With the bias voltage maintained at a level sufficiently above the threshold voltage to be easily measurable, i.e., at least 5 volts above a threshold voltage of 625 volts, illumination with only 300 microwatt/cm.$^2$ produced a large change in frequency, as can be seen by comparing the top and bottom traces in FIG. 10. The light-induced frequency jump was abrupt, and no combination of light intensity or bias voltage was found which would produce stable oscillations at intermediate frequencies across the entire pulse width (100 nanoseconds). That is, there was no intermediate frequency to which the device would switch; it would oscillate only in the transit-time mode or the light-induced mode. By lowering the light intensity below 300 microwatt/cm.$^2$, however, an intermediate, mixed-mode state could be reached in which different portions of the pulse were occupied by the two distinct frequencies. Thus, as shown in the intermediate traces of FIG. 10, the higher-frequency mode appears at the leading edge of the pulse and occupies a progressively larger portion as the illumination intensity is increased from zero.

Studies with monochromatic light showed that this particular oscillator was most sensitive to wavelengths near 9,000A., that sensitivity decreased slowly with decreasing wavelength, and that the effect disappears rapidly with increasing wavelength. It will be recognized by those skilled in the art that the maximum sensitivity at 9,000A. corresponds closely to the bandgap of *n*-type gallium arsenide. When the polarity of the applied voltage pulse is reversed, a slightly different high frequency state is observed. However, the sum of the periods of the two high frequency states observed with different polarities is approximately equal to the period of the low-frequency state.

Figure 11:
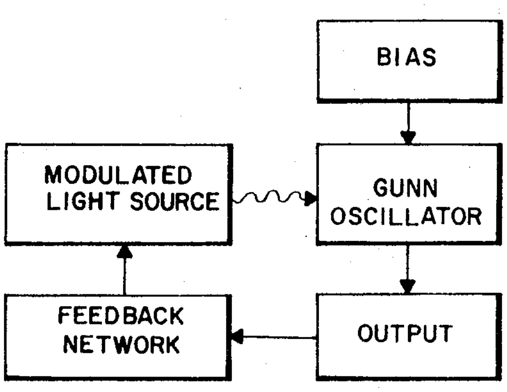
FIG. 11 represents, in block diagram form, circuitry for controlling the output of a Gunn oscillator with light.
Figure 14:
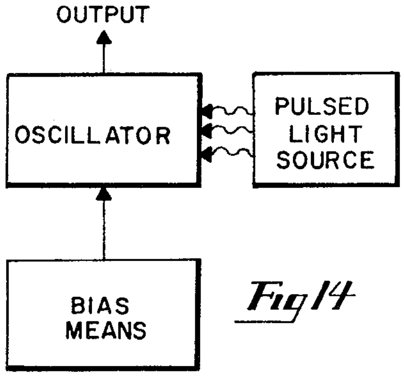
FIG. 14 represents, in block diagram form, apparatus for affecting the output of a Gunn oscillator utilizing a pulsed light source.

While the foregoing description of the operation of a device of the invention will suggest many logic-circuit applications to one of ordinary skill in the art, one special application for the device concerns optical sensing and deliberate feedback. For example, a properly biased Gunn-effect device of the invention can sense incident illumination from a particular light source and switch briefly to its high frequency. This switching can be used in turn to control the light source itself. The capability to provide an interaction between the light source and the light-sensitive device makes possible a wide range of bistable and monostable logic devices which, if desired, can exhibit timing and scaling properties that are continuously variable according to the light intensity. Too, the device of the invention is extremely attractive for this type of switching application because it possesses an inherent amplification feature. With the device, it is possible to control the several watt power output of a Gunn oscillator with light of only micro-watt intensity. In effect, this is analogous to the function of the grid in a vacuum tube or the base of a transistor, and the impingement of a tiny amount of light-power on the oscillator modulates a considerable amount of electrical power. Such an arrangement is shown schematically in FIG. 11.

A device of the invention has particular utility in logic-circuit applications. Since an optical connection has no inherent feedback or reflected impedance, the light-responsive Gunn-effect device is extremely advantageous for use wherever many signal paths must converge upon, or diverge from, a single point. Thus, in the case of optical interconnections, the signal paths consist of light which does not have the disadvantages of an electrical conductor.

Yet another application of the device of the invention is as a detector of light. Again, the built-in amplification feature of the device and its high sensitivity give it superior qualities not possessed by most state of the art devices. Not only is the device useful for merely detecting the presence of light, it can also measure light intensity and is uniquely adaptable for optical communication using pulsed light.

Also, it should be noted that the use of narrow band-gap materials (such as InSb) as Gunn oscillators, with their attendant potential for light control in the manner herein described, makes possible the realization of a whole new class of highly sensitive infrared sensors. Naturally, the wavelengths at which they will be most sensitive will be a function of the bandgap of the particular oscillators.

Furthermore, the device is singularly adaptable to analog-to-digital conversion. An analog-to-digital converter is a device for converting information in the form of continuously varying signals into digital signals. Commonly, the converter is used to transform information into a form suitable for processing on a digital computer. The analog information frequently is taken from measurements of voltages, resistances, temperatures, forces, angles of rotation or other continuous quantities, and is generally first represented by an analog electrical signal which is then converted to a digital signal.

Figure 12:
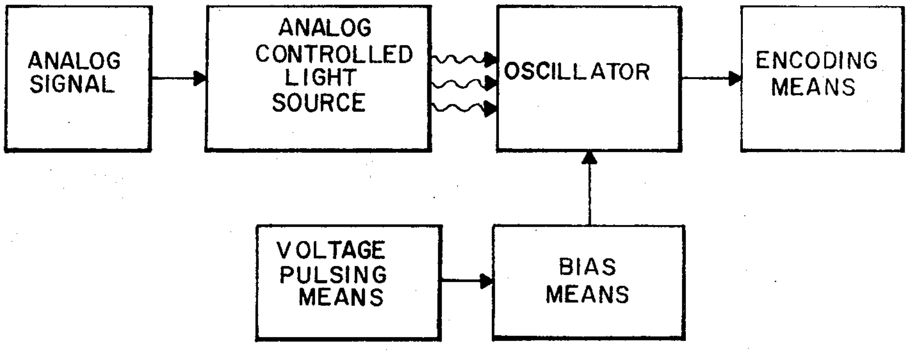
FIG. 12 represents, in block diagram form, circuitry employing a device of the invention for converting analog signals to digital form.
Figure 13:
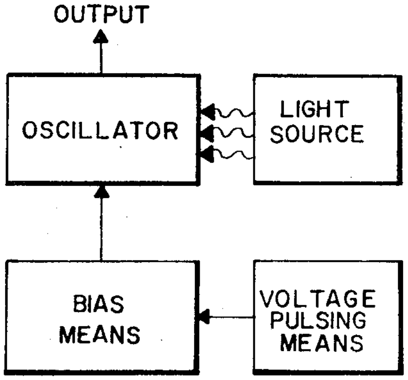
FIG. 13 represents, in block diagram form, apparatus for affecting the output of a Gunn oscillator utilizing a pulsed voltage.

The components of an analog-to-digital converter for utilizing the invention include means for providing an analog signal in the form of light, a Gunn-effect oscillator in optical connection with the source of light, bias pulsing means, and an encoding element. As illustrated in FIG. 12, a continuously varying analog signal is applied to a light source. The intensity of the light thereby generated is directly proportional to the analog signal. The light impinges upon the optically controllable Gunn oscillator. The Gunn oscillator is easily operated in a regular, intermittent manner by suitable bias pulsing means, with a suitable delay time between pulses to permit the oscillator to reach a stable condition between pulses. Such pulsed operation effectively constitutes sampling of the analog signal. The Gunn-effect device converts the analog signal, represented by light of varying intensity, into what may be aptly described as a digital signal. As described above, the greater the intensity of the incident light, the greater is the portion of the bias pulse occupied by the higher-frequency oscillations (which can be counted with the use of conventional apparatus). The digital signal produced by the Gunn-effect device is then encoded by conventional means into binary words. It will be understood by those skilled in the art that the signal output of the Gunn device is not itself a binary word, but only a series of counts which can be converted into a binary code by known techniques. As may be seen, by way of example, from the second trace in FIG. 10, a count of five has been recorded, i.e., the device oscillated at the higher frequency for five cycles. This number corresponds to a specific voltage in the analog signal. The count is then encoded to represent that particular voltage.

Alternatively, an analog-to-digital converter may employ a light-sensitive Gunn oscillator operated continuously from a DC bias supply, while a sufficiently bright light source is pulsed to produce light whose intensity varies in accordance with a desired analog signal. Still further, a similarly bright light source may operate continuously with an intensity that varies in accordance with some analog signal, and a suitable light-interrupting means may be employed to provide the sampling effect so as to produce intermittent operation of the oscillator.

The response time and capacity of an analog-to-digital converter employing a light-responsive Gunn-effect device is illustrated by the following example. A gallium arsenide crystal having a frequency of oscillation in darkness of 1 GHz. is prepared in accordance with this invention for use in the converter. The oscillator is pulsed once every microsecond, which produces a pulse width of 1,000 cycles. This pulse width yields a dynamic range of 1,000:1, which means that the approximate equivalent of a 10-bit word can be converted every microsecond.

Those skilled in the art will recognize that a plurality of trap zones could be obtained by suitably doping an appropriate semiconductor (by ion bombardment, etc.) with the result that a corresponding number of frequencies of oscillation could be obtained. Thus, as a first zone of traps (resulting from the introduction of deep-lying acceptors within the crystal) becomes filled and begins to pass traveling electric field domains instead of annihilating them, the domains will travel for a longer distance before they reach a second zone of traps resulting from the introduction of a second quantity of deep-lying acceptors within the crystal. The greater period of time that the domains travel in order to reach the second trap zone will produce a frequency of oscillation still higher than the usual Gunn-effect frequency but lower than the frequency associated with the first zone of traps. Eventually, as all of the traps are filled, the domains will travel all of the way to the anode before they are terminated, such that the frequency of oscillation will then remain indefinitely at the so-called transit-time frequency until, for example, the bias is removed. Upon removing the bias and by maintaining appropriate conditions, all of the traps can be made to quickly empty, and the cycle is capable of being repeated. If the acceptor material used to dope the crystal is selected so that the individual trap zones are uniquely sensitive to light of a particular wavelength, the device can be made to discriminate between light of different wavelengths as well as light of different intensities.

It should be apparent, too, that other variations and modifications may be made without departing from the present invention. Accordingly, it should be understood that the forms of the present invention described above and shown in the accompanying drawing are illustrative only and not intended to limit the scope of the invention.

What is claimed is:

1. Apparatus of the type described comprising:

a semiconductor crystal of the Gunn-effect type and having at least one localized zone of deep-lying acceptors introduced into the crystal lattice structure, such crystal being adapted to exhibit transit-time oscillations of a first frequency and light-dependent oscillations at a higher frequency, means for biasing said crystal to generate an electric field therein above a threshold level, whereby the transit-time oscillations can be established, means for illuminating the localized zones containing the deep-lying acceptors, whereby the light-dependent oscillations can be established in the presence of a generated electric field, and means for utilizing the oscillations exhibited by said crystal.

2. Apparatus of the type described as set forth in claim 1 wherein said biasing means includes means for supplying a fixed-period voltage pulse to said crystal.

3. Apparatus of the type described as set forth in claim 2 wherein said means for utilizing the oscillations includes means responsive to the change in oscillations from one frequency to the other frequency during the period of said voltage pulse.

4. Apparatus of the type described as set forth in claim 1 wherein one zone of the deep-lying acceptors is introduced into the crystal lattice structure at a location to establish a desired frequency having a fixed ratio with the transit-time oscillations, and a second zone is introduced at another location in the crystal.

5. Apparatus of the type described as set forth in claim 1 wherein said means for utilizing the oscillations includes means for discriminating between oscillations of transit-time frequency and the light-dependent frequency.

6. Apparatus of the type described as set forth in claim 1 and further including means for counting the number of cycles at which the crystal oscillates at a particular frequency.

7. The apparatus as claimed in claim 6 wherein the semiconductor crystal is *n*-type gallium arsenide and the deep-lying acceptors comprise acceptor ions of gold.

8. Apparatus of the type described, comprising:

a semiconductor crystal of the Gunn-effect type having at least one localized zone of deep-lying acceptors introduced into the crystal lattice structure, said crystal having a length between two spaced electrodes to establish transit-time oscillations of a first frequency and said crystal exhibiting light-dependent oscillations at higher frequencies determined by the location of zones of deep-lying acceptors, means for biasing said crystal with a DC voltage pulse above a threshold level to generate an electric field therein to establish the transit-time oscillations, means for illuminating the localized zones containing the deep-lying acceptors in the presence of the generated electric field to establish the light-dependent oscillations, and means for utilizing the oscillations of the semiconductor crystal.

9. Apparatus of the type described as set forth in claim 8 wherein said means for utilizing includes means responsive to the change in oscillations from one frequency to another when biased with said DC voltage pulse.

10. The method of establishing oscillations in a semiconductor crystal of the Gunn-effect type which has at least one localized zone of deep-lying acceptors introduced into the crystal lattice structure, said crystal having a first frequency when biased above a threshold level as a singular function of length of the crystal between two spaced electrodes, and exhibiting light-dependent oscillations at a higher frequency, comprising the steps of:

biasing said crystal above a threshold level to generate an electric field therein to establish traveling domains, and selectively annihilating traveling electric field domains within the semiconductor crystal by illuminating the localized zone containing the deep-lying acceptors, whereby light-induced oscillations may be established.

11. A method of establishing oscillations in a semiconductor crystal as set forth in claim 10 including the step of adjusting the temperature of the semiconductor crystal to establish the threshold level for biasing of said crystal.

12. A method of establishing oscillations in a semiconductor crystal as set forth in claim 10 including the step of adjusting the critical filling factor of the semiconductor crystal to establish the threshold level for biasing of said crystal.

13. The method as claimed in claim 9 wherein the crystal is illuminated with light of variable intensity, and at least part of the time the light is of sufficient intensity that the deep-lying acceptors are emptied at a faster rate than they are being simultaneously filled as a result of domain capture.

14. The method as claimed in claim 9 wherein the crystal is illuminated with light of such an intensity that the deep-lying acceptors are filled at a faster rate than light empties them.

15. The method of establishing oscillations in a semiconductor crystal of the Gunn-effect type having at least one localized zone of deep-lying acceptors introduced into the crystal lattice structure, said crystal having a first frequency when biased above a threshold level as a function of length of the crystal between two spaced electrodes and exhibiting light-dependent oscillations at a higher frequency, comprising the steps of:

initially emptying the deep-lying acceptors to an extent which is a function of the intensity of illumination of the localized zone containing the deep-lying acceptors in the semiconductor crystal, and subsequently biasing said crystal above a threshold level to generate an electric field therein so as to initially establish the higher frequency and after an interval of time establish the transit-time oscillations.

16. The method of establishing oscillations in a semiconductor crystal of the Gunn-effect type having at least one localized zone of deep-lying acceptors introduced into the crystal lattice structure, said crystal having a first frequency when biased above a threshold level as a function of length of the crystal between two spaced electrodes and exhibiting light-dependent oscillations at a higher frequency, comprising the steps of:

initially biasing said crystal above a threshold level to generate an electric field therein so as to fill all deep-lying acceptors and thereby establish Gunn-effect transit-time oscillations, and subsequently illuminating the zone of deep-lying acceptors with light of sufficient intensity that the acceptors on balance give up more electrons than they capture such that eventually they are sufficiently empty to trap all nucleated domains and the crystal switches to its light-dependent frequency of oscillation.

* * * * *